United States Patent [19]

Shirasaki et al.

[11] 4,181,884
[45] Jan. 1, 1980

[54] ROTATIONAL POSITION DETECTION DEVICE USING A REFERENCE MARK AND TWO SENSORS SPACED INTEGER TIMES APART

[75] Inventors: Shinji Shirasaki, Kariya; Takashi Yamada, Anjo; Hiroyasu Fukaya, Nagoya; Yukio Sakakibara, Anjo, all of Japan

[73] Assignee: Nippondenso Co., Ltd., Kariya, Japan

[21] Appl. No.: 913,738

[22] Filed: Jun. 6, 1978

[30] Foreign Application Priority Data

Jul. 20, 1977 [JP] Japan ............................ 52/96622[U]

[51] Int. Cl.² ............................................. G01B 7/00
[52] U.S. Cl. ................................. 324/208; 123/117 D
[58] Field of Search ............... 324/166, 173, 174, 175, 324/207, 208; 123/148 E, 117 D, 117 A, 117 R; 340/199, 671, 672

[56] References Cited

U.S. PATENT DOCUMENTS 4,024,458  5/1977  Templin ............................. 324/208

Primary Examiner—Robert J. Corcoran
Assistant Examiner—Walter E. Snow
Attorney, Agent, or Firm—Cushman, Darby & Cushman

[57] ABSTRACT

A rotational position detecting apparatus for use in spark ignition control systems for internal combustion engines. A plurality of angular informations are provided circularly on a rotatable disk except at the predetermined reference angular position of said rotatable disk. Two of the angular informations provided beside the reference angular position are spaced twice as wide as a predetermined angular interval between other two of the angular informations. A first and second signal generators spaced integer times as wide as the predetermined angular interval from each other are associated with the rotatable disk for generating respective a.c. output signals in response to the passing of each of said angular informations. The a.c. output signals of the first and second signal generators are applied to an electric circuit which subtracts one of the a.c. output signals from the other of the a.c. output signals and shapes the subtraction resultant signal into a pulse signal.

5 Claims, 6 Drawing Figures

ROTATIONAL POSITION DETECTION DEVICE USING A REFERENCE MARK AND TWO SENSORS SPACED INTEGER TIMES APART

CROSS REFERENCE TO A RELATED APPLICATION

This patent application is related to the United States patent application Ser. No. 833,042 which is titled "ROTATIONAL REFERENCE POSITION DETECTING APPARATUS" and filed on Sept. 14, 1977 under the name of SHIRASAKI et al, now U.S. Pat. No. 4,145,608.

BACKGROUND OF THE INVENTION

The present invention relates to a rotational position detecting apparatus available for producing two output signals one of which is synchronized with the rotation of a rotatable disk to a predetermined reference angular position and the other of which is synchronized with the predetermined unit angular rotation of the rotatable disk.

It is well known in the field of spark ignition control for an internal combustion engine that the ignition timing must be changed in correspondence with changes in the engine operating conditions to operate the internal combustion engine at the possible highest efficiency. Since the ignition timing is determined generally as retard angles in rotation of an engine output shaft relative to a reference angular position, it is required that both the reference angular position and unit angular rotation of the engine output shaft are detected.

SUMMARY OF THE INVENTION

It is an object of this invention to provide a rotational position detecting apparatus which is enabled to detect both the reference angular position and the unit angular rotation of the engine output shaft.

BRIEF DESCRIPTION OF THE DRAWINGS

In the accompanying drawings.

DETAILED DESCRIPTION OF THE PREFERRED EMBODIMENT

Figure 1:
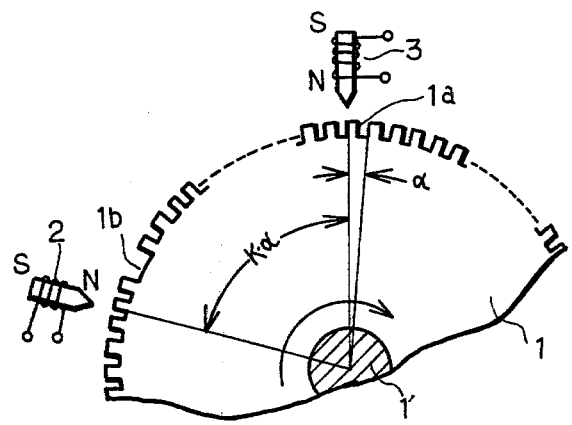
FIG. 1 is a schematic view illustrating the positional relationship between a rotatable disk and two signal generators used in the embodiment of this invention.
Figure 4:
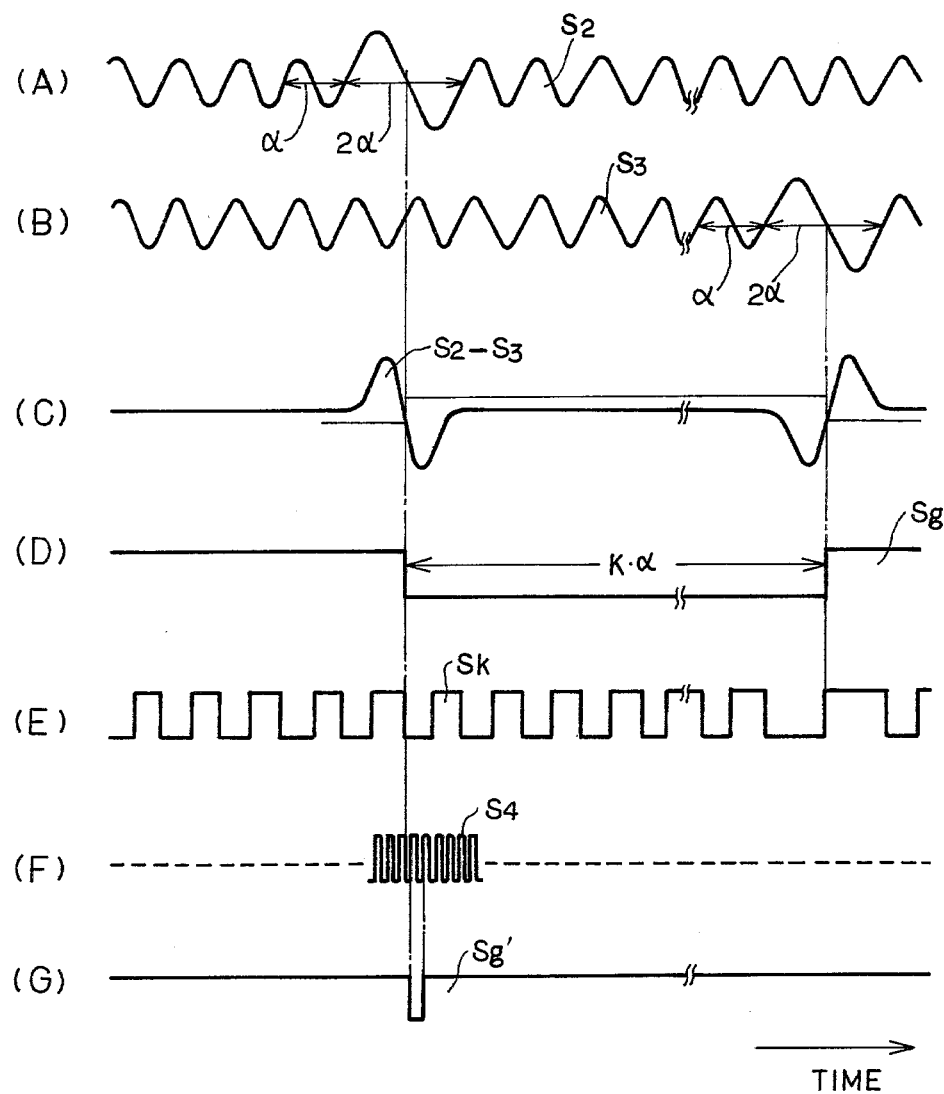
FIG. 4 is a time chart illustrating the waveforms of signals (A) through (G) produced in the electric circuits of FIGS. 2 and 3.

Referring first to FIG. 1 illustrating the positional relationship between a rotatable disk 1 and two signal generators 2 and 3, the disk 1 made of iron is coupled with the output shaft 1' such as the crankshaft of an internal combustion engine (not shown) at the center axis thereof to be rotated clockwise and is provided with a plurality of unit angular informations 1a and a reference angular information 1b on the outer periphery thereof. The unit angular informations 1a are formed by respective uniform projections provided at every predetermined angular interval $\alpha$, whereas the reference angular information 1b is formed by no projection provided at a predetermined position. Therefore two of the unit angular informations 1a provided beside the reference angular information 1b are spaced from each other by the angular interval $2\alpha$ which is twice as wide as the angular interval $\alpha$. Each of the signal generators 2 and 3 which are same in structure is comprised of a magnet positioned to face the outer periphery of the disk 1 and a winding wound on the magnet such that an a.c. output signal is generated from the winding at every passing of the projections of the disk 1. The signal generators 2 and 3 are spaced from each other by a predetermined angular interval $K\cdot\alpha$ which is integer times as wide as the angular interval $\alpha$. The a.c. output signals $S_2$ and $S_3$ of the signal generators 2 and 3 are shown in (A) and (B) of FIG. 4, respectively. It should be noticed in FIG. 4 that both of the a.c. output signals $S_2$ and $S_3$ have two kinds of cycle periods one of which is corresponding to the angular interval $\alpha$ of the unit angular information 1a and the other of which is corresponding to the angular interval $2\alpha$ of the reference angular information 1b. The a.c. output signal $S_3$ is delayed from the a.c. output signal $S_2$ by a time corresponding to the angular interval $K\cdot\alpha$ by which the signal generators 2 and 3 are spaced.

Figure 2:
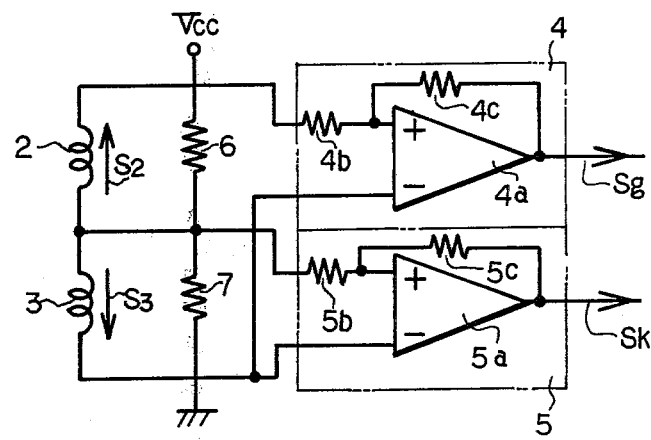
FIG. 2 is an electric wiring diagram illustrating the details of an electric circuit associated with the two signal generators of FIG. 1.

As shown in FIG. 2, the signal generators 2 and 3 or the windings thereof are connected in series such that the a.c. output signal $S_2$ and $S_3$ are generated in opposite directions relative to the junction therebetween. The junction between the signal generators 2 and 3 is connected to the junction between resistors 6 and 7 connected in series between a constant voltage source Vcc and the ground. Although the a.c. output signals $S_2$ and $S_3$ are superimposed on a divided constant voltage produced at the junction between the resistors 6 and 7, the a.c. output signal $S_3$ is subtracted from the a.c. output signal $S_2$ to result in a differential output signal $S_2-S_3$ shown in (C) of FIG. 4. As can be seen from FIG. 4, the differential output signal changes the signal amplitude when the a.c. output signal $S_2$ or $S_3$ has the cycle period corresponding to the angular interval $2\alpha$. The signal generators 2 and 3 are connected to a comparator circuit 4 which is comprised of an operational amplifier 4a, an input resistor 4b and a feedback resistor 4c. The operational amplifier 4a receives a noninverting input signal corresponding to the output signal $S_2$ at the noninverting input (+) through the input resistor 4b and an inverting input signal corresponding to the output signal $S_3$ at the inverting input (−). The operational amplifier 4a generally produces an output pulse signal Sg which has a constant high level and a constant low level when the noninverting input signal becomes higher and lower than the inverting input signal respectively. However, since the feedback resistor 4c is connected between the noninverting input (+) and the output of the amplifier 4a, the output pulse signal Sg is produced in dependence on the hysteresis operation of the amplifier 4a. As a result the threshold level of the amplifier 4a is established low and high in correspondence with respective high level and low level of the output pulse signal Sg as shown exemplarily in (C) of FIG. 4. It is a matter of course that the change in the threshold level is determined by a resistance ratio between the resistors 4b and 4c. As shown in (D) of FIG. 4, the output pulse signal $S_g$ changes from the high level to the low level when the differential output signal $S_2-S_3$ falls below the low threshold level, whereas the output signal $S_g$ changes from the low level to the high level when the differential signal $S_2-S_3$ rises above the high threshold level. It should be noticed herein that the level change of the output pulse signal $S_g$ is synchronized with the passing of the reference angular information $1b$ through the signal generator 2 or 3. The signal generator 3 is further connected to a comparator circuit 5 which is comprised of an operational amplifier $5a$, an input resistor $5b$ and a feedback resistor $5c$. Operating in the same manner as the comparator circuit 4, the comparator circuit 5 produces an output pulse signal Sk as shown in (E) of FIG. 4. Since the output signal Sk is synchronous with the output signal $S_3$ of the signal generator 3, it is also synchronous with the passing of the informations $1a$ and $1b$ through the signal generator 3.

Figure 3:
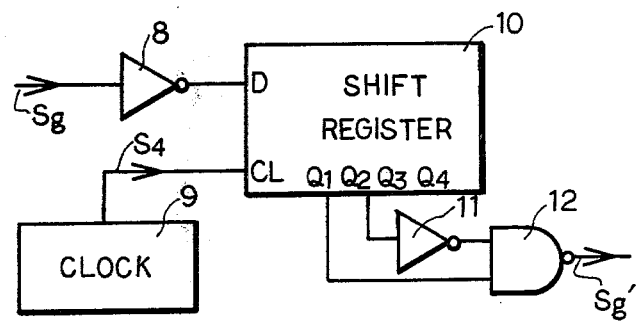
FIG. 3 is an electric wiring diagram illustrating the details of an electric circuit associated with the electric circuit of FIG. 2.

As shown in FIG. 3 comparator circuit 4 which produces the output signal $S_g$ having a time interval corresponding to the angular interval $K \cdot \alpha$ is connected to a shift register 10 through an inverter 8. A clock generator 9 which generates clock pulses $S_4$ of a fixed frequency is connected to the shift register 10. The shift register 10, receiving the output pulse signal $S_g$ in inverted form from the inverter 8, produces the inverted output signal $S_g$ sequentially from the lowest digit output $Q_1$ to the highest digit output $Q_4$ in response to each of the clock pulse $S_4$ shown in (F) of FIG. 4. Before the output pulse signal $S_g$ changes from the high level to the low level, the shift register 10 produces low level output signals at respective outputs $Q_1$ through $Q_4$ with the inverted signal applied from the inverter 8. After the output pulse signal $S_g$ changed from the high level to the low level, the shift resistor 10 produces the high level signal only at the lowest digit output $Q_1$ in response to the first one of clock pulses $S_4$ and then produces the high level signals only at the lowest and second lowest digit outputs $Q_1$ and $Q_2$ in response to the second one of clock pulses $S_4$. The output signal produced at the lowest digit output $Q_1$ is applied to a NAND gate 12 and the output signal produced at the second lowest output $Q_2$ is applied to the NAND gate 12 through an inverter 11. Since the NAND gate 12 produces a low level output signal $S_g'$ only when both input signals are at high level, the low lovel output signal $S_g'$ is produced when the shift register 10 produces the high level signal and the low level signal at the outputs $Q_1$ and $Q_2$ respectively. As described hereinabove this is possible only when the first one of clock pulses $S_4$ is applied from the clock generator 9 to the shift register 10 after the change of the output pulse signal $S_g$ from the high level to the low level. The output pulse signal $S_g'$ has a short time period equal to one cycle period of the clock pulses $S_4$ as shown in (G) of FIG. 4. Although the low level output signal $S_g'$ is slightly delayed from the level change of the output signal $S_g$, the output signal $S_g'$ can be synchronized substantially with the passing of the reference angular information $1b$ through the signal generator 2. It is a matter of course that the delay in time between the signals $S_g$ and $S_g'$ can be made negligible with the clock frequency being high enough.

Figure 5:
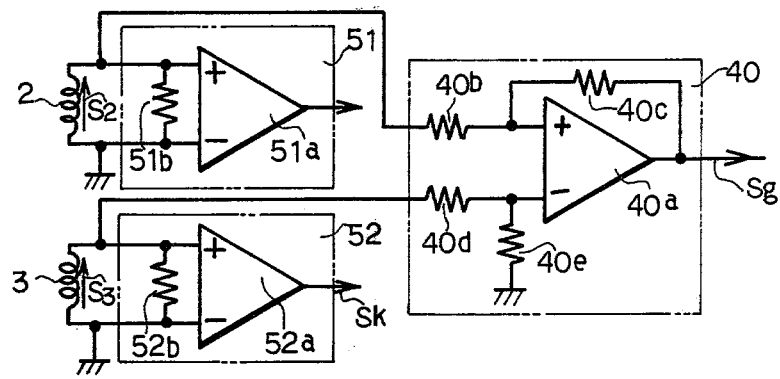
FIG. 5 is an electric wiring diagram illustrating the modification of the electric circuit of FIG. 2.

To derive the output pulse signal $S_g'$ which is synchronized with the passing of the reference angular information $1b$ through the signal generator 2, the electric circuit shown in FIG. 3 may be connected to an electric circuit shown in FIG. 5 as a modification of the electric circuit shown in FIG. 2. As shown in FIG. 5, the signal generator 2 is grounded and connected to a comparator circuit 51 comprising an operational amplifier $51a$ and a resistor $51b$, whereas the signal generator 3 is grounded and connected to a comparator circuit 52 comprising an operation amplifier $52a$ and a resistor $52b$. Since the a.c. output signals $S_2$ and $S_3$ of the signal generators 2 and 3 are shaped into respective pulse signals, the pulse signal $S_k$ produced from the comparator circuit 52 is synchronous with but opposite in output level relative to the output pulse signal $S_k$ produced by the comparator circuit 5 shown in FIG. 2. Although each of the pulse signals produced from the comparator circuits 51 and 52 has two cycle periods corresponding to the respective angular intervals $\alpha$ and $2\alpha$, it is made possible to derive a pulse signal which has a single cycle period corresponding to the unit angular interval $\alpha$. This can be attained by a single OR logic element (not shown) which subjects the output pulse signals of the comparator circuits 51 and 52 to OR logic operation. It should be further noticed in FIG. 5 that the signal generators 2 and 3 are connected to a comparator circuit 40 comprising an operational amplifier $40a$ and resistors $40b$, $40c$, $40d$ and $40e$. The operational amplifier $40a$, receiving the a.c. output signal $S_2$ at the noninverting input $(+)$ through the resistor $40b$ and the a.c. output signal $S_3$ at the inverting input $(-)$ through the resistor $40d$, compares the two a.c. output signals $S_2$ and $S_3$ to produce the output pulse signal $S_g$ in the same manner as the comparator circuit 4 shown in FIG. 2. Therefore the output pulse signal $S_g$ produced from the comparator circuit 40 can be applied to the electric circuit shown in FIG. 3.

Figure 6:
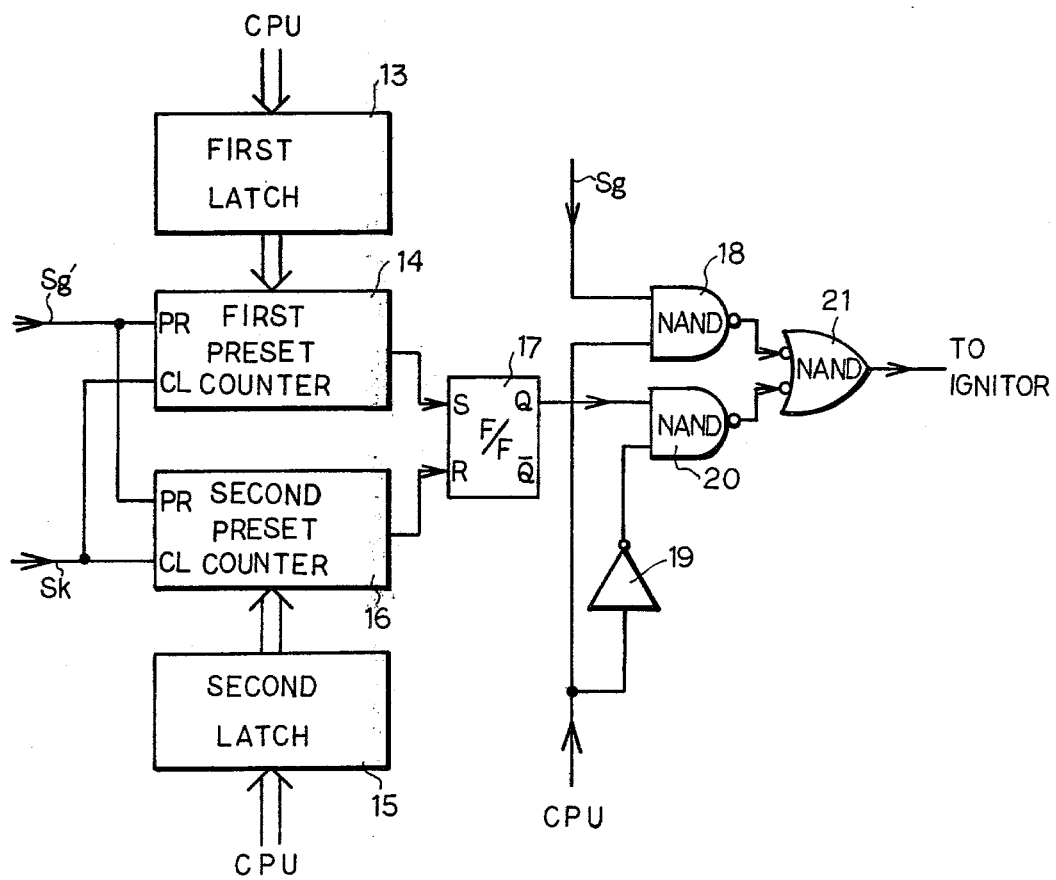
FIG. 6 is an electric wiring diagram illustrating the details of a spark ignition control system with which the electric circuits of FIGS. 2, 3 and 5 are associated.

The output pulse signals $S_k$ and $S_g'$ are used in a spark ignition control system such as shown in FIG. 6. It is assumed in the system shown in FIG. 6 that the timings when an ignition coil is energized and deenergized are determined by a central processing unit in a conventional manner as respective retard angles relative to a predetermined rotational position of the engine output shaft $1'$. To meet this assumption the signal generator 2 is positioned to face the reference angular information $1b$ when the engine output shaft $1'$ is rotated to the predetermined rotational position.

Referring to FIG. 6, a first latch 13 is connected to the CPU to receive and memorize a first binary signal indicative of a first retard angle for deenergizing the ignition coil, whereas a second latch 15 is connected to the CPU to receive and memorize a second binary signal indicative of a second retard angle for energizing the ignition coil. A first and second preset counters 14 and 16 each of which receives the output pulse signal $S_g'$ at a preset input PR and the output pulse signal $S_k$ at a clock input CL are connected to the first and second latches 13 and 15 respectively. The outputs of the first and second preset counters 14 and 16 are respectively connected to the set and reset inputs S and R of a flip-flop 17 the output Q of which is connected to a NAND gate 20. A NAND gate 18 is connected to receive the output pulse signal $S_g$ having the time interval corresponding to the angular interval $K \cdot \alpha$. The NAND gate 18 is further connected to the CPU to receive a high level output signal indicative of the failure of the CPU. The NAND gate 20 is also connected to receive the high level output signal from the CPU through an inverter 19. Both of the NAND gates 18 and 20 are connected to another NAND gate 21 which controls the ignition coil through an ignitor. The ignitor is of the type which energizes and deenergizes the ignition coil while the signal level of an applied signal is low and high respectively.

In operation of the engine which rotates the output shaft 1', the output pulse signal $S_g'$ is produced in substantial synchronization with the passing of the reference angular information 1b through the signal generator 2 and the output pulse signal $S_k$ is produced in synchronization with the passing of each of the unit angular informations 1a through the signal generator 2 or 3. The first and second preset counters 14 and 16 preset the first and second binary signals therein respectively in response to the output pulse signal $S_g'$ and count the output pulses $S_k$ thereafter. When the count value of the second preset counter 16 becomes equal to the preset value indicative of the coil energizing timing, the flip-flop 17 is reset by the second preset counter 16 and produces a low level output signal from the output Q. On the other hand, when the count value of the first counter 14 becomes equal to the preset value indicative of the coil deenergizing timing, the flip-flop 17 is set by the first preset counter 14 and produces a high level output signal from the output Q. As long as the CPU operates properly, no high level signal is produced from the CPU. As a result, the NAND gate 20 is allowed to pass the output signal of the flip-flop 17 but the NAND gate 18 is not allowed to pass the pulse signal $S_g$. With a high level output signal produced from the NAND gate 18, the NAND gate 21 is alowed to pass the output signal of the NAND gate 20. Since the output signal of the NAND gate 21 changes in response to the output signal of the flip-flop 17, the ignition coil is energized and deenergized when the reference angular information 1b is rotated by the first and second retard angles respectively from the reference angular position where the signal generator 2 is positioned. A spark ignition voltage is generated from the ignition coil when the ignition coil is deenergized.

Provided that the CPU fails to operate properly, the first and second preset counters 14 and 16 and the flip-flop 17 cannot control the coil energizing and deenergizing timings properly any more. On this occasion the inverter 19 receives the high level signal indicative of the failure of the CPU to apply the low level signal to the NAND gate 20 which responsively produces the high level signal irrespective of the output signal of the flip-flop 17. The NAND gate 18 is allowed to pass the output pulse signal $S_g$ in response to the high level signal produced from the CPU. With the high level signal produced from the NAND gate 20, the NAND gate 21 is allowed to pass the output signal of the NAND gate 18. Since the output pulse signal $S_g$ has a time interval corresponding to the constant angular interval K·α as shown in (D) of FIG. 4, the ignition coil is energized and deenergized when the reference angular information 1b passes the signal generators 2 and 3 respectively. Therefore, although the ignition timing cannot be changed in response to the change in the engine operating conditions, the spark ignition voltage can be generated to maintain the operation of the engine.

It should be noticed in the above-described embodiment that, when the spark ignition control system illustrated in FIG. 6 is associated with the engine having a plurality of cylinders, the output pulse signal $S_g'$ must be generated for each cylinders. To meet this requirement, the numbers of the reference angular information 1b provided on the outer periphery of the rotatable disk 1 may be increased or counter circuits which count the output pulse signals $S_k$ may be provided to generate other output pulse signals $S_g'$.

The invention described hereinabove is not limited to the embodiment but may be modified without departing from the spirit of the invention.

What we claim is:

1. A rotational position detecting apparatus comprising:
   a rotatable disk;
   a plurality of unit angular informations provided circularly on said rotatable disk and spaced from each other by a first constant angular interval except at a predetermined position indicative of the reference angular position of said rotatable disk, two of said unit angular informations provided beside said predetermined position being spaced from each other by a second constant angular interval which is twice as wide as side first constant angular interval;
   a first signal generator positioned adjacent to said rotatable disk for generating a first signal in response to the passing of each of said unit angular informations therethrough;
   a second signal generator positioned adjacent to said rotatable disk for generating a second signal in response to the passing of each of said unit angular informations therethrough, said second signal generator being spaced from said first signal generator by a third constant angular interval which is integer times as wide as said first constant angular interval such that said second signal is in a delayed relation with said first signal;
   differential means responsive to said first and second signals and effective to produce a differential output signal corresponding to the difference in signal amplitude between said first and second signals; and
   comparator means responsive to said differential output signal and effective to produce a pulse output signal when the amplitude of said differential output signal reaches a threshold level thereof such that said pulse output signal indicates the rotation of said reference angular position of said rotatable disk to the position of said first signal generator.

2. A rotational position detecting apparatus according to claim 1, wherein said differential means includes:
   a voltage source for supplying a constant voltage;
   resistors connected in series with said voltage source for providing a divided voltage at the junction therebetween;
   common connection means for connecting said first and second signal generators in common to said junction of said resistors such that said first and second signals are superimposed on said divided voltage;
   first connection means for connecting said first signal generator to said comparator means; and
   second connection means for connecting said second signal generator to said comparator means,
   and wherein said comparator means includes:
   an input resistor connected to said first connection means;
   an operational amplifier having noninverting an inverting input terminals connected to said input resistor and said second connection means respectively and having an output terminal; and a feedback resistor connected between said noninverting input terminal and output terminals of said operational amplifier.

3. A rotational position detecting apparatus according to claim 1 or 2 further comprising:
- a clock generator for generating a train of clock pulses at a fixed frequency;
- a shift circuit connected to said comparator means and said clock generator for sequentially producing said pulse output signal from the lowest to the highest digit output terminals thereof in response to each of said clock pulses; and
- a logic circuit connected to said shift circuit for subjecting two output signals produced from the lowest and the second lowest output terminals of said shift circuit to a predetermined logical operation to thereby produce another output pulse signal in response to said output pulse signal produced from said comparison means, said another output pulse signal having a time period equal to one cycle period of each of said clock pulses.

4. A rotational position detecting apparatus comprising:
- a rotatable disk;
- a plurality of unit angular informations provided circularly on said rotatable disk and spaced from each other by a first constant angular interval except at a predetermined position indicative of the reference angular position of said rotatable disk, two of said unit angular informations provided beside said predetermined position being spaced from each other by a second constant angular interval which is twice as wide as said first constant angular interval;
- a first signal generator positioned adjacent to said rotatable disk for generating a first signal in response to the passing of each of said unit angular informations therethrough;
- a second signal generator positioned adjacent to said rotatable disk for generating a second signal in response to the passing of each of said unit angular informations therethrough, said second signal generator being spaced from said first signal generator by a third constant angular interval which is integer times as wide as said first constant angular interval such that said second signal is in a delayed relation with said first signal; and
- a comparator means responsive to said first and second signals and effective to compare the amplitude of said first signal with the amplitude of said second signal, said comparator means producing an output pulse signal in synchronization with the passing of said reference angular position of said rotatable disk through said first signal generator.

5. A rotational position detecting apparatus according to claim 4 further comprising:
- a clock generator for generating a train of clock pulses at a fixed frequency;
- a shift circuit connected to said comparator means and said clock generator for sequentially producing said output pulse signal from the lowest to the highest digit output terminals among a plurality of output terminals thereof in response to each of said clock pulses; and
- a logic circuit connected to said shift circuit for subjecting two output signals produced from two of said output terminals of said shift circuit to a predetermined logical operation to thereby produce another output pulse signal slightly delayed in time relative to said output pulse signal produced from said comparator means.

* * * * *